Aug. 2, 1966 N. L. ROHMFELD 3,263,405
FEED CONDITIONER

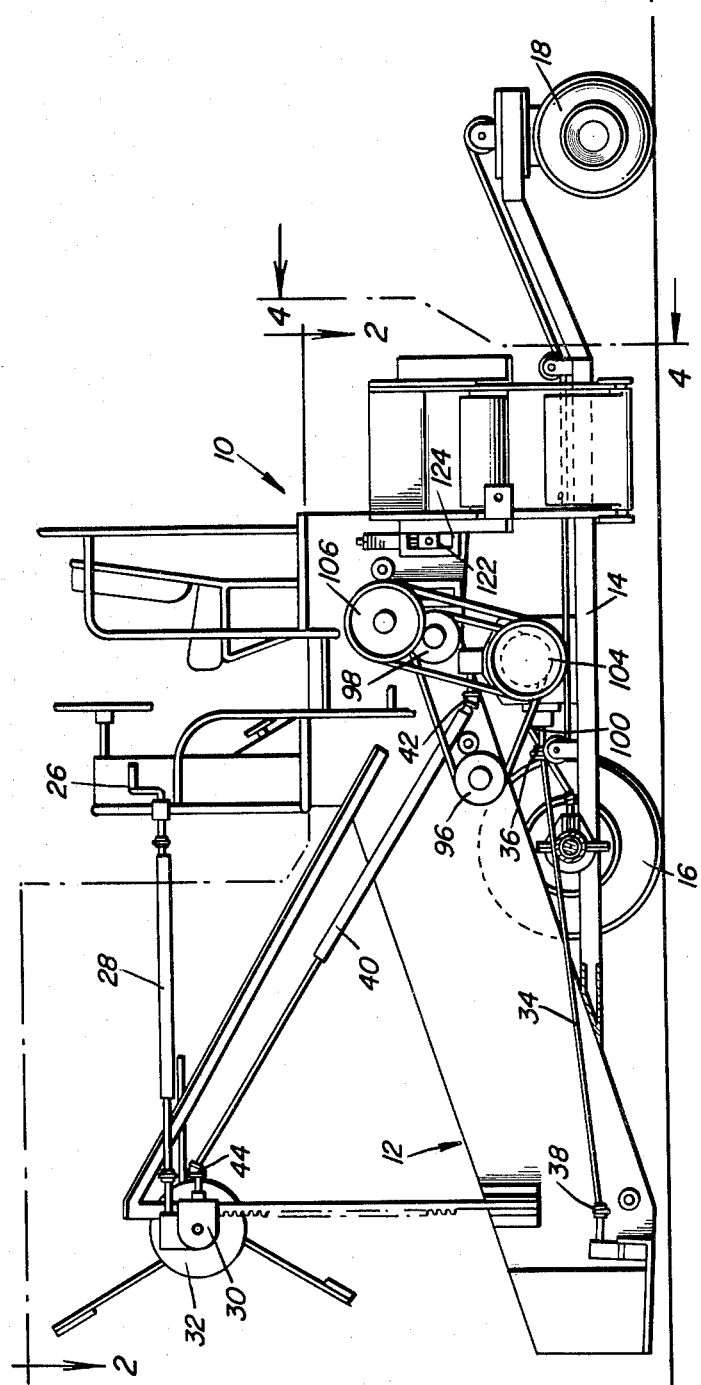
Fig. I
Norbert L. Rohmfeld
INVENTOR.

Filed March 13, 1964 5 Sheets-Sheet 2

Norbert L. Rohmfeld
INVENTOR.

BY
Attorneys

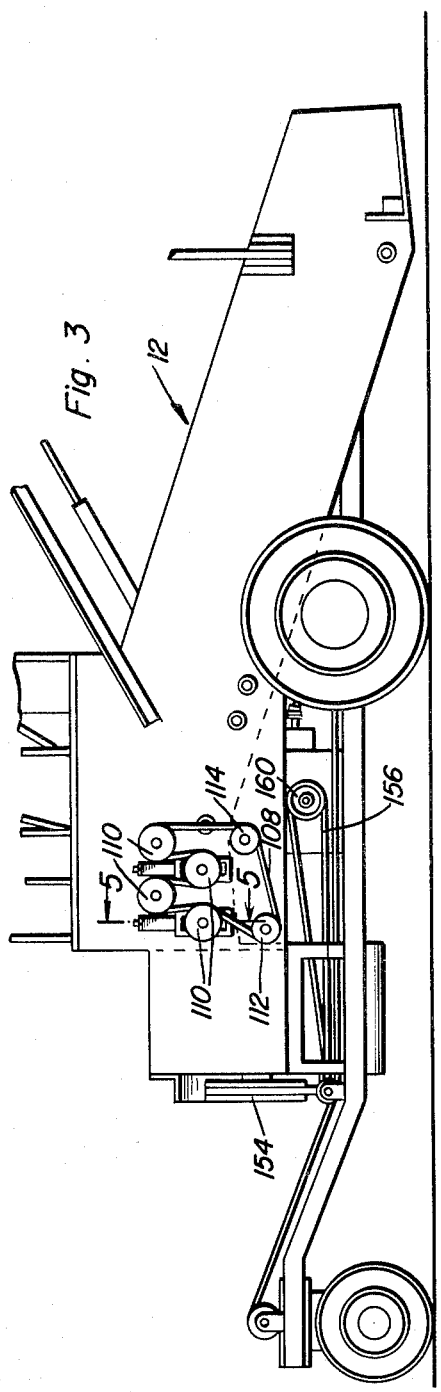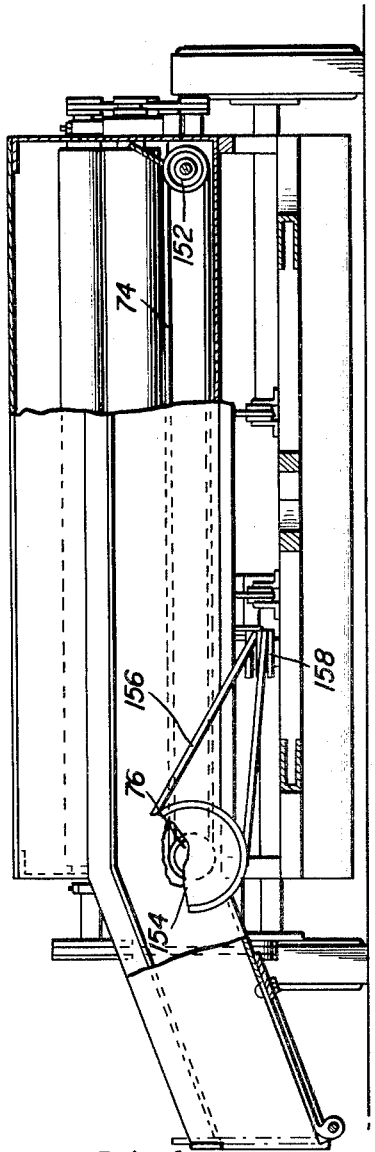

Aug. 2, 1966  N. L. ROHMFELD  3,263,405
FEED CONDITIONER
Filed March 13, 1964  5 Sheets-Sheet 4
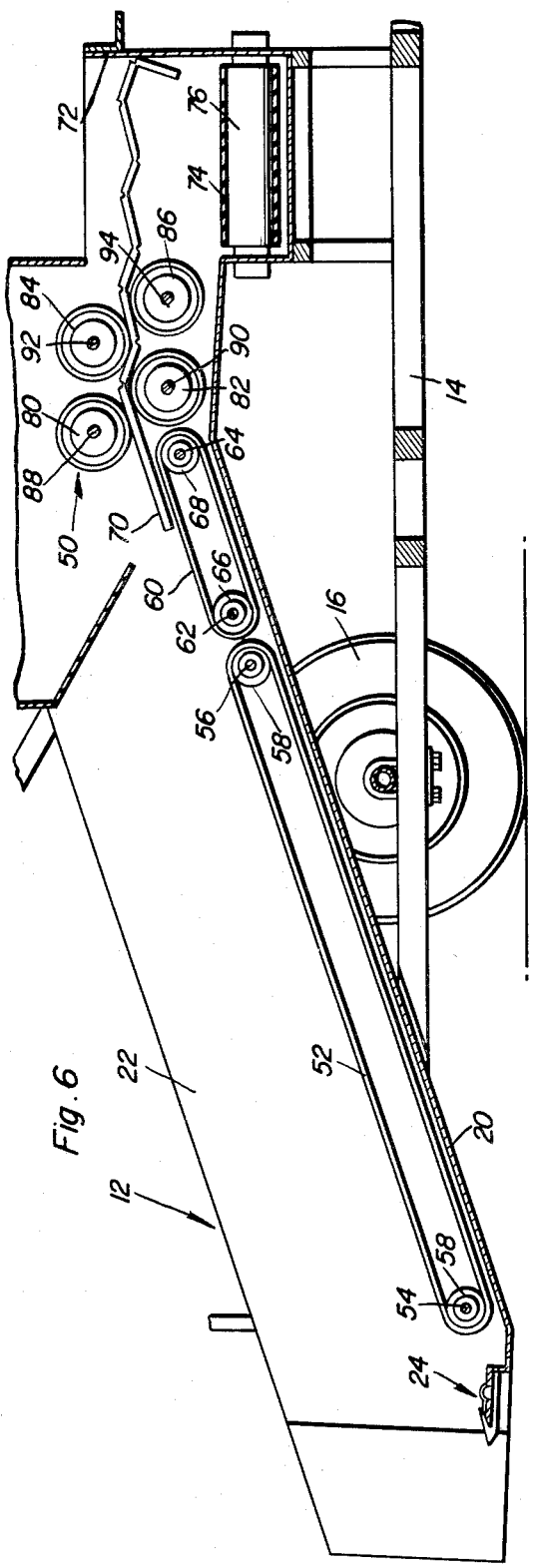
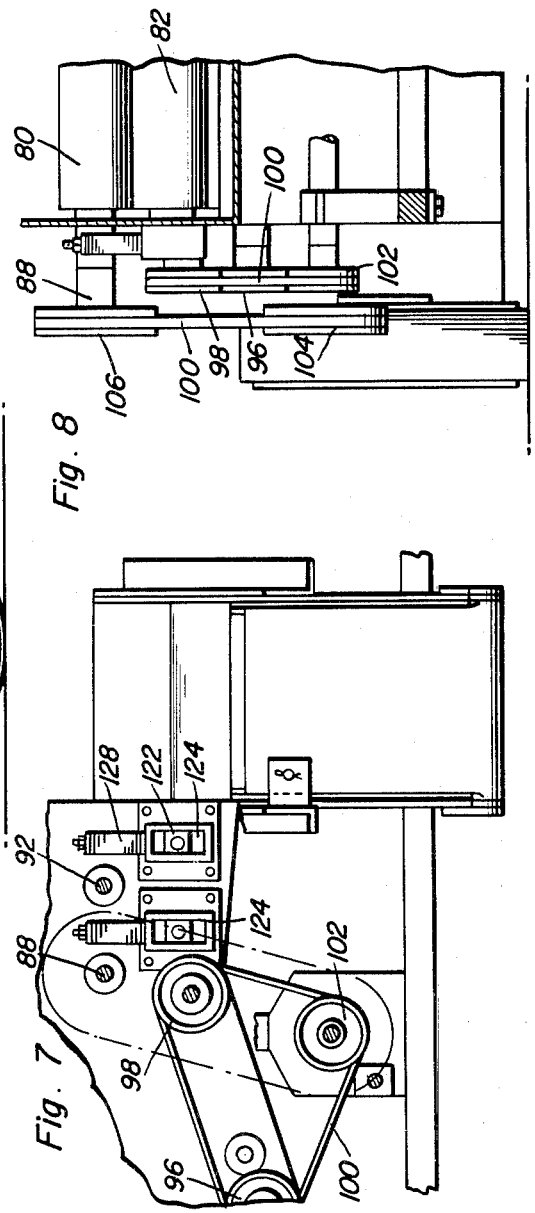
Norbert L. Rohmfeld INVENTOR.
BY
Attorneys

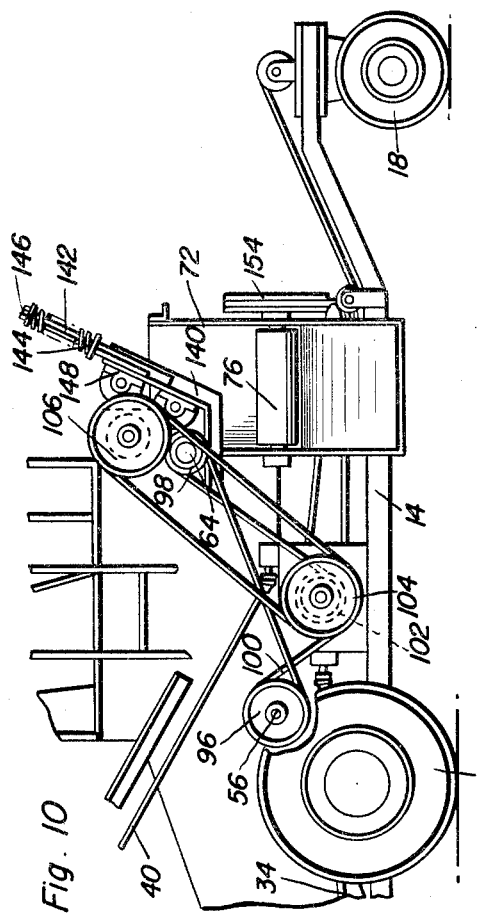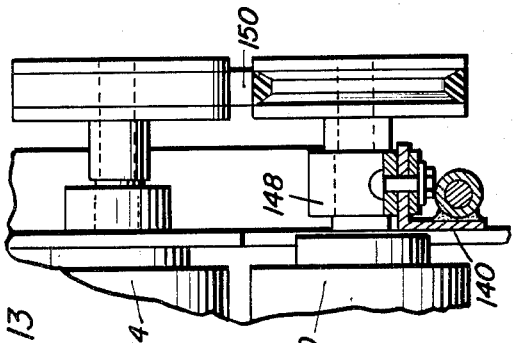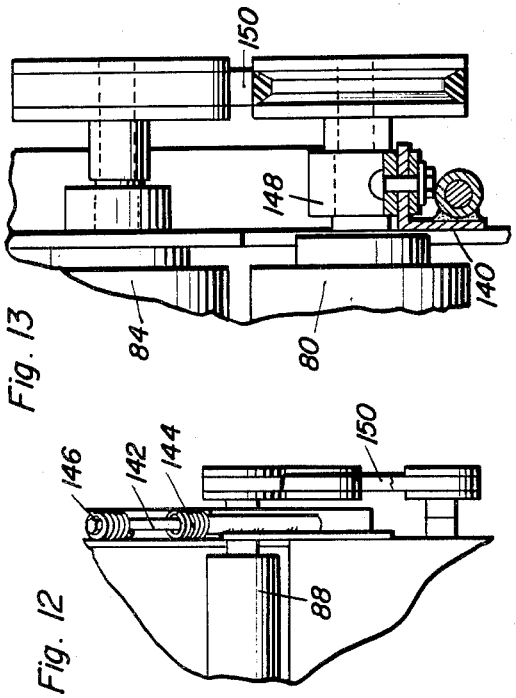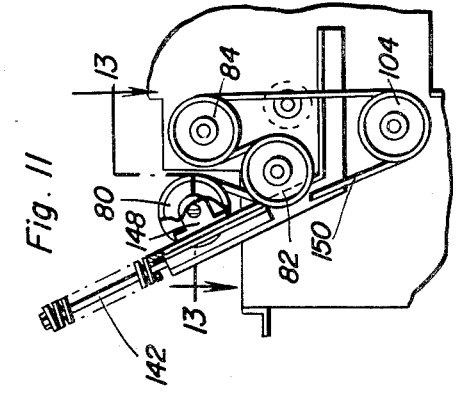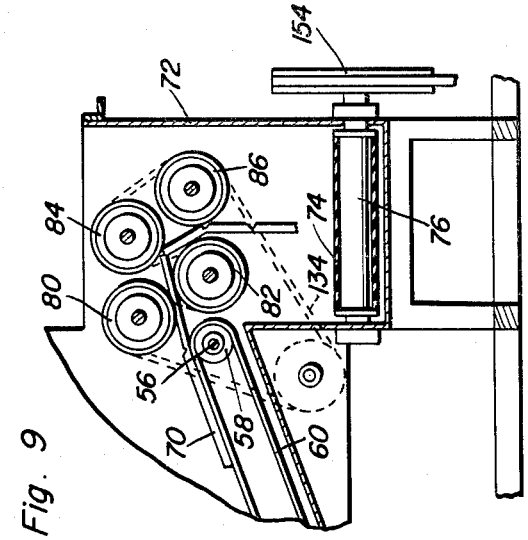

United States Patent Office 3,263,405
Patented August 2, 1966

3,263,405
FEED CONDITIONER
Norbert L. Rohmfeld, Rural Route, Rowena, Tex.
Filed Mar. 13, 1964, Ser. No. 351,607
4 Claims. (Cl. 56—23)

This invention comprises a novel and useful feed conditioner and more particularly pertains to an apparatus adapted to facilitate the drying time of stemmed vegetation employed as feed.

When stemmed vegetation such as stalks of various crops are dried and employed as stock feeds, varying lengths of time are required for the cut crop to be dried before it may be baled and stored for subsequent use. For example, a crop having stalks or stems ⅜ of an inch in diameter and about 3 to 4 feet tall usually requires 7 to 10 days after cutting for drying in the sun and wind before they are in condition for baling. Hybrid forage feeds recently introduced and having stalks varying from one-half to one inch or more in diameter usually require from 2½ to 3 weeks for drying.

It is therefore the primary purpose of this invention to provide an apparatus and a process whereby various types of stem feeds may be so treated as to greatly facilitate and shorten the time required for the crops to dry in the sun and wind prior to baling.

As a result of the practice of the present invention, it has been found that the drying time for substantially all stalk or stemmed vegetation suitable for use as feed can be shortened to less than one week thereby resulting in a saving in time, an improvement in the color of the feed by retaining its rich green color and by an increase in the nutrient value of the feed by preventing the leaching of vital elements of the feed during prolonged exposure to the sun and wind.

It is therefore the primary purpose of this invention to provide an apparatus and a process which will greatly shorten the drying time for stemmed feeds and specifically to reduce the drying time for substantially all types of feeds to less than one week.

A further object of the invention is to provide an apparatus in accordance with the preceding objects which can be readily adapted to different heights of crops as for example relatively low crops of from 3 to 4 feet in height and taller crops up to 10 feet in height.

It is a further specific object of the invention to provide an apparatus which will effectively crush the stalks during their passage therethrough thereby exposing the interior of the stalk to effective action by the sun and wind to facilitate drying thereof.

A still further purpose of the invention is to provide an apparatus capable of handling two rows of crops simultaneously.

Still further, it is an object of the invention to provide an apparatus which will windrow the crushed stalks for convenient drying in the sun and for subsequent handling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a suitable form of apparatus in accordance with this invention;

FIGURE 3 is a side elevational view of the apparatus of FIGURE 1 but taken from the other side thereof and with parts being broken away and omitted;

FIGURE 4 is a view chiefly in rear elevation and with parts broken away and shown in section and is taken substantially upon the plane indicated by the section line 4—4 of FIGURE 1;

FIGURE 6 is a view in vertical longitudinal section taken upon an enlarged scale substantially upon a plane indicated by the broken section line 6—6 of FIGURE 2 and showing in particular the relationship of the crushing rollers of this invention and their association with the stalk feeding means;

FIGURE 7 is a detail view in side elevation of a portion of FIGURE 1 but upon an enlarged scale;

FIGURE 8 is a further detail view in end elevation and in vertical transverse section of the crushing roller driving means;

FIGURE 9 is a detail view of the righthand portion of FIGURE 6 and showing an alternative operation of the crushing rollers;

FIGURE 10 is a view similar to FIGURE 1, parts broken away and showing further details of the driving mechanism of the invention;

FIGURE 11 is a detail view in side elevation of a further feature of the invention;

FIGURE 12 is a view in elevation and taken at right angles from FIGURE 11; and

FIGURE 13 is a detail view taken upon an enlarged scale in horizontal section substantially upon the plane indicated by the section line 13—13 of FIGURE 11.

Figures 2, 5:
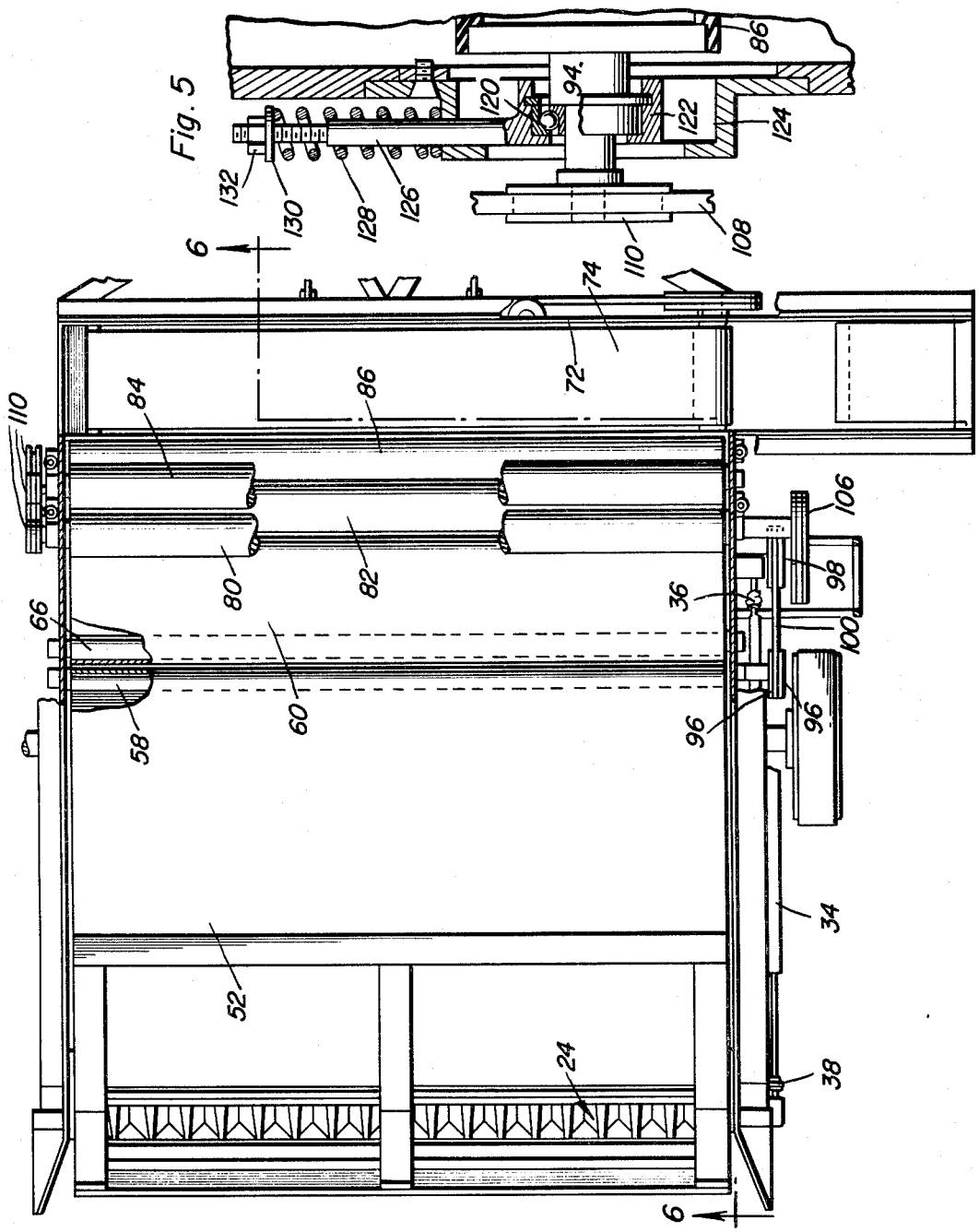
FIGURE 2 is a view partly in top plan and partly in horizontal section taken upon the plane indicated by the broken section line 2—2 of FIGURE 1 and with further parts being broken away and shown in section therein.
FIGURE 5 is a detail view taken upon an enlarged scale in vertical transverse section substantially upon the plane indicated by the section line 5—5 of FIGURE 3 and showing the resilient journaling and loading means of one of the crushing rollers of the apparatus.

The essence of this invention resides in the provision of a series of power operated crushing rollers so disposed with respect to each other that they will progressively crush the section of the stem or stalk of vegetation passing therethrough thereby breaking the stalk transversely at spaced intervals along its length as well as splitting the stalk longitudinally in order to effectively expose the interior of the stalk to the action of the sun and wind to facilitate drying of the stalk. For convenience of illustration, the crushing roller assembly and its operating means of this invention has been illustrated as applied to and combined with a conventional agricultural machine such as the well known Massey-Harris Clipper Combine. However, it will be appreciated that the crushing roller assembly can be combined with other suitable machines or mechanisms or even can be operated as an independent apparatus to perform its desired function.

In the accompanying drawing, the numeral 10 designates generally any suitable form of apparatus into which is incorporated the stalk crushing device of this invention. As illustrated the apparatus consists of a Massey-Harris Clipper Combine which is a machine of the self-powered type. The machine includes an inclined apron or chute-like trough indicated generally by the numeral 12 which is mounted upon a mobile chassis 14 having driving wheels 16 and steering wheels 18. As will be best apparent from FIGURES 2 and 6, the feed apron or trough 12 includes an inclined bottom wall 20 together with a pair of side walls 22 open at their front ends. A cutter head indicated generally by the numeral 24 is mounted in the open front end of the trough or chute 12 and extends thereacross and may include the conventional power operated sickle bar by which stalk-type crops are cut upon forward travel of the apparatus.

The trough 12 is pivotally mounted at its rear end by any suitable means, not shown, for vertical tilting about a transverse horizontal axis. Since this is conventional structure of the Massey-Harris machine and forms no part of the invention claimed hereinafter, a further description thereof is deemed to be unnecessary. The machine includes a vertical adjustment means which may consist of a handcrank 26, a telescopingly adjustable shaft 28 and a rack and pinion drive mechanism 30 by means of which the reel 32 is raised and lowered in order to properly position it to operate upon different sizes and types of crops. Conveniently, the reel 32 is power operated and serves to move the growing stalk crop into the cutter head and upon the chute or trough 12 during forward travel of the machine.

From any suitable source of power, not shown, power is conveyed by a drive shaft 34 having universal joints as at 36 and 38 to the cutter head cutter bar for operating the latter. Similarly, the drive shaft 40 having universal joints as at 42 and 44 is connected to the reel for operation of the latter. It is to be noted that each of the drive shafts 34 and 40 are preferably longitudinally extensible so that they may accommodate themselves to varying vertical adjustments of the chute or trough 12 and of the reel 32.

Referring now specifically to FIGURES 2 and 6, it will be observed that there is mounted within the trough or chute 12 and above the bottom wall 20 thereof means for causing longitudinal passage of stalks from the cutter head into the stalk crusher roller assembly indicated generally by the numeral 50. This means consists of a first conveyor 52 in the form of an endless web or belt which is entrained over a pair of axles 54 and 56 having rollers 58 thereon, and by which the cut stalks are conveyed from the cutter head toward the crusher roller assembly 50. There is further provided a second conveyor 60 in the form of a web or belt which is entrained over a pair of axles as at 62, 64 having rollers 66 and 68 thereon. This second conveyor is interposed between the first conveyor 52 and the crushing roller assembly 50 to receive stalks from the first conveyor and discharge them into the crushing roller assembly. As set forth hereinafter, drive means are provided whereby the second conveyor moves at a considerably greater rate of speed than the first conveyor in order that the stalks delivered to the second conveyor from the first conveyor will be transported in a relatively thinner layer for better treatment by the crushing roller assembly.

The numeral 70 indicates a stalk during its passage through the apparatus and including particularly its passage through the crusher roller assembly 50.

The stalk passes through the crusher roller assembly with a sufficient speed to cause it to be thrown against a vertical back wall or baffle 72 so that, as illustrated in FIGURE 6, it will drop down upon the windrowing conveyor 74. The latter consists of a web or belt which is entrained over a pair of rollers 76 and 152, see FIGURE 4, and is conveyed laterally of the longitudinal line of travel of the stalks from the cutter head to the crushing roller assembly to be deposited laterally to one side of the apparatus in a windrow. Preferably, the machine is of sufficient width to cut and treat two rows of stalks and deliver them to a common windrow. By reversing the direction of travel of the machine from the two succeeding rows, the stalks from the next two rows may be deposited upon the same windrow, thereby facilitating subsequent handling of the stalks after they have dried sufficiently for baling and storage as a stock feed.

It is the crushing roller assembly 50 which forms the essence of this invention and for an explanation thereof attention is now directed more specifically to FIGURE 6. It will be observed that the assembly includes at least two longitudinally spaced pairs of upper and lower crushing rollers 80 and 82 for the first pair and 84 and 86 for the second pair. These rollers are suitably journaled in the framework of the machine or apparatus to which this invention is applied and have axles 88, 90, 92 and 94, respectively. It will be observed that the lower rollers of the two pairs are staggered with respect to the upper rollers. Consequently, as the stalk 70 passes through the rollers it will be sharply bent downwardly and then upwardly effecting breaking of the stalk transversely thereof. This will break the stalk into relatively short lengths still more or less attached to each other as shown in FIGURE 6. In addition to this transverse breakage of the stalk along its length, the rollers crush the stalks longitudinally thereof to thus crush, mash and split the stalks along their lengths thereby exposing the interior of the stalks for more rapid drying by the sun and wind after the stalks are discharged from the conveyor 74.

It is preferred that the spacing between the rollers of the first pair is relatively greater than that between the rollers of the second pair so that the first pair of rollers will accommodate relatively large stalks while the second pair of rollers will complete the mashing or crushing of the stalks passing through the first rollers and will also crush and mash stalks which are of too small a size to be effectively crushed by the first pair of rollers.

In some instances, as shown in FIGURE 9, it may be preferred to cause the broken and crushed stalks to drop downwardly between the bottom pair of rollers 82 and 86 directly upon the windrowing conveyor 74. This may be effected by appropriately spacing the rollers 82 and 86 and rotating the roller 86 counterclockwise as set forth hereinafter.

An important feature of this invention is that the lower rollers in each pair are resiliently but yieldably urged towards the upper roller. This is for the purpose of permitting the rollers to separate and permit the passage of solid foreign matter therethrough when the latter is carried with the stalks through the crushing roller assembly 50, in order to avoid damage to the latter. For this purpose, upper bearing means of any suitable character are provided for journaling the upper rollers by their axles 88 and 92 for rotation about stationary or fixed axes. However, the bearing means for the lower rollers 82 and 86 are provided with resilient mounting means which yieldingly urge their movable axes toward the upper rollers.

The driving means for the first and second conveyor rollers and for the crushing roller assembly is as follows: Referring to FIGURE 2 it will be observed that the roller 58 of the first conveyor has a driving pulley 96 thereon while the rollers 68, see also FIGURE 10, has a driving pulley 98 thereon of lesser size than the pulley 96. A driving belt 100 is entrained over these two pulleys 96 and 98 and also over a pulley 102 connected in any suitable manner to the source of power for the machine. Thus, the second conveyor is driven at a considerably greater rate of speed than the first conveyor in accordance with the diameters of the pulleys 98 and 96. A further pulley 104 on the source of power is connected to a pulley 106 which in turn is secured to the shaft 88 of the crushing roller 80. Thus, motion is imparted to this crushing roller.

Referring to the other side of the machine, as shown in FIGURE 3, it will be observed that the belt 108 is connected to a series of pulleys 110 each of which is secured to one of the crusher roller shafts 88, 92, 90 and 94 and to a pair of idler pulleys 112 and 14. Thus, each of the crusher rollers is power driven.

Reference is now made specifically to FIGURE 5 which discloses a means for yieldingly urging the lower rollers against the upper rollers. The resilient and adjustable mounting means for the bearing members of the two lower rollers 82 and 86 are identical and consequently in FIGURE 5 there is shown the mounting means for the lower roller 86. This includes a bearing asesmbly 120 which journals the shaft or axle 94 within a sliding bearing block 122 received in a suitable guide channel 124 formed in the framework of the machine. A stem 126 extends upwardly from the movable bearing block and is surrounded by a compression spring 128 which bears against a spring retainer washer 130 on the stem 126. An adjusting nut 132 provides a means for adjusting the compression of the spring. As will be noted from FIGURE 6, the spring, one being provided at each side of the lower roller, is adjustable to yieldingly urge the lower roller upwardly toward the upper roller with an adjustable resilient force.

Referring again to FIGURE 9 it will be observed that when it is desired to direct the crushed and broken stalks directly downwardly upon the windrowing conveyor 74, the lower roller 86 is given a different direction of rotation from that of the roller 82. For that purpose, the belt arrangement 134 shown in FIGURE 9 is entrained about the pulleys of the rollers, thereby causing the rollers 80, 84 and 86 to rotate in a counterclockwise direction while the roller 82 rotates in a clockwise direction. Thus the stalk will be drawn between the rollers 80 and 82 as in the preceding form of the invention, will be further brought forwardly by the roller 84, and will be forced downwardly by the counter-clockwise rotating roller 86.

FIGURES 10–13 disclose a modified arrangement for spring loading the roller assembly. In this form of the invention there are provided on opposite sides of the machine, guides 140 having slidable stems or rods 142 therein surrounded by compression springs 144 having adjusting nuts 146 upon the stems. The upwardly spring urged stems 142 are provided with journal bearings 148 upon which are journalled the shaft of the driving upper roller 88. A driving belt 150 is entrained over corresponding pulleys on each of the rollers 80, 82 and 84 and over the driving pulley 104 previously mentioned. In this form but three rollers are necessary, the roller 86 of the preceding forms of the invention being omitted.

As will be observed from FIGURE 4, the windrow conveyor 74 is entrained over a pair of rollers 76 previously mentioned and a roller 152. A pulley 154 on the roller 76 is driven as by a belt 156 entrained about idler or guide pulleys 158 and connected to a driving pulley 160 as shown in FIGURE 3. In this manner, power is imparted to the windrow conveyor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for crushing stalks to facilitate their drying as stock feed comprising two spaced pairs of cooperating upper and lower crushing rollers, means for causing longitudinal passage of stalks to be crushed between said rollers of each pair whereby the stalks being acted upon are crushed and split along substantially their entire length, said lower crushing rollers being horizontally staggered from said upper crushing rollers, one of said lower rollers being disposed intermediate of said upper rollers and one of said upper rollers being disposed intermediate of said lower rollers whereby the stalks passing therebetween will be bent to break the stalks transversely during their travel through said rollers, said means for causing longitudinal passage of stalks comprises a first conveyor transporting stalks toward said rollers, a second conveyor receiving stalks from said first conveyor and delivering them to said rollers, said second conveyor having a greater speed of travel than said first conveyor thereby spreading the stalks more thinly prior to their delivery to said rollers.

2. The combination of claim 1 including a vertical baffle disposed adjacent said rollers and against which stalks are thrown by their discharge from said rollers.

3. The combination of claim 2 including a windrowing conveyor receiving stalks from said baffle and supplying them to a windrow.

4. An apparatus for crushing stalks to facilitate their drying as stock feed comprising two longitudinally spaced pairs of cooperating upper and lower crushing rollers, means for causing longitudinal passage of stalks between said rollers of each pair, said pairs being displaced vertically from each other sufficiently to effect a vertical bending and breaking of stalks transversely as they are crushed longitudinally during their travel through said rollers, a cutting head and reel disposed in advance of said means for causing longitudinal passage of stalks for cutting and delivering stalks to the latter, said means for causing longitudinal passage of stalks comprises a first conveyor transporting stalks toward said roller, a second conveyor receiving stalks from said first conveyor and delivering them to said rollers, said second conveyor having a greater speed of travel than said first conveyor thereby spreading the stalks more thinly prior to their delivery to said rollers, means for vertically adjusting said cutting head and said first conveyor simultaneously and said reel independently for accommodating growing stalks of different height.

References Cited by the Examiner

UNITED STATES PATENTS

| | | | |
|---|---|---|---|
| 1,319,190 | 10/1919 | Van Houten | 198—34 |
| 2,521,999 | 9/1950 | Scott | 56—1 |
| 2,664,684 | 1/1954 | Russell | 56—1 |
| 2,790,289 | 4/1957 | Tufford | 56—1 |
| 2,857,946 | 10/1958 | Nikkel. | |
| 2,999,348 | 9/1961 | Cunningham | 56—23 |

OTHER REFERENCES

Brillion Hay Conditioning Brochure, Form 91; 6 pages.

ABRAHAM G. STONE, *Primary Examiner.*

ANTONIO F. GUIDA, *Examiner.*